UNITED STATES PATENT OFFICE 2,689,169

PROCESS FOR THE PRODUCTION OF HYDROGEN PEROXIDE

Wilbie S. Hinegardner, Niagara Falls, N. Y., assignor to E. I. du Pont de Nemours & Company, Wilmington, Del., a corporation of Delaware No Drawing. Application November 5, 1949, Serial No. 125,831

3 Claims. (Cl. 23—207)

This invention relates to the production of hydrogen peroxide using an alkylated anthraquinone as an intermediate. More especially it relates to the use of a particular alkylated anthraquinone which has been found to be outstanding for this purpose.

U. S. Patent 2,158,525 discloses a process for the production of hydrogen peroxide wherein an alkylated anthraquinone is hydrogenated in a solvent by means of hydrogen in the presence of a catalyst to the corresponding anthrahydroquinone which, after separation of the catalyst, is oxidized by means of oxygen to produce hydrogen peroxide. The starting anthraquinone is regenerated during the oxidation and is recycled to the hydrogenation stage after first removing the product hydrogen peroxide, e. g. by aqueous extraction. The alkylated anthraquinones specifically suggested for use as intermediates in such a process are: methyl-, ethyl-, propyl- and isopropylanthraquinones. Of these, 2-ethylanthraquinone appears to have been regarded heretofore as the most suitable for practical use. The present invention is based on the discovery that 2-tertiary-butylanthraquinone is far superior for this purpose to the alkylated anthraquinones heretofore proposed.

It is, accordingly, one object of the present invention to provide an improved process for the production of hydrogen peroxide wherein an alkylated anthraquinone is used as an intermediate. A further object is to provide an improvement in the production of hydrogen peroxide by such a process wherein an alkylated anthraquinone is used which has been found to be outstanding among the alkylated anthraquinones for this purpose. Still further objects will be apparent from the following description.

These objects are accomplished in accordance with the invention by producing hydrogen peroxide in a cyclic process of the type generally described above using as the alkylated anthraquinone intermediate 2-tertiary-butylanthraquinone. This compound has been found to be exceedingly stable in such a reduction-oxidation cyclic system and to be soluble to an unusually high degree in either its reduced or oxidized state in solvents which are suitable for use in such a process.

In cyclic processes of the present type, wherein an alkylated anthraquinone is alternately reduced, oxidized and recycled, it is customary and desirable to carry out the reduction and oxidation stages in the same solvent and for this purpose various types of solvents have been proposed. Examples of such solvents are mixtures of compounds such as benzene, toluene and the like with, for example, amyl alcohol, cyclohexanol or methylcyclohexanol, as has been suggested in U. S. Patent 2,215,883. Any of these previously proposed solvents may be employed in practicing the present invention. It is preferred, however, that a solvent be used which is a mixture of a primary or a secondary nonyl alcohol with a monomethyl- or a dimethylnaphthalene. Preferred solvent constituents are diisobutylcarbinol or 3,5,5-trimethylhexanol-1 and alpha-methylnaphthalene. The use of such solvents in processes of this type is proposed in the copending application of Harris and Sprauer, Serial No. 125,847, filed November 5, 1949 and which has issued as Patent No. 2,668,753 February 9, 1954. Generally, the solvent should contain 25 to 75% of the nonyl alcohol and 75 to 25% of the substituted naphthalene, the preferred proportions being 65 to 35% of the former and 35 to 65% by volume of the latter. These solvents are characterized by their high stability in use, low vapor pressure, low solubility in water and their low solvent power for water. A further and highly important advantage in using such a solvent is that the distribution coefficient of hydrogen peroxide between water and the solvent is exceptionally high. This feature together with the high solubility of 2-tertiary-butylanthraquinone and its corresponding anthrahydroquinone in these solvents permits the obtainment of aqueous hydrogen peroxide solutions of high concentration directly by practical extraction methods without resort to evaporation or concentration treatments. By use of such solvents and the present intermediate anthraquinone at least 90% of the $H_2O_2$ content of the working solution in the oxidized stage may be recovered as 35 to 40% aqueous hydrogen peroxide by simple countercurrent extraction methods.

In carrying out the reduction of the present alkylated anthraquinone to the corresponding anthrahydroquinone any suitable hydrogenation catalyst may be employed. Various catalysts have been heretofore proposed for use in hydrogenating alkylated anthraquinone, nickel being usually suggested. Raney nickel, produced by leaching aluminum-nickel alloys with aqueous sodium hydroxide, appears to have been regarded as the most suitable catalyst in such hydrogenations. I prefer, however, to employ as catalyst palladium supported on activated alumina as disclosed in the copending application of Sprauer, Serial No. 125,848, filed November 5, 1949 and which has issued as Patent No. 2,657,980 November 3, 1953. Such a catalyst may be prepared by any of the well-known methods for preparing supported catalysts, e. g. by impregnating a support material which is predominantly activated alumina with a soluble palladium compound, such as palladous chloride or chloropalladous acid, and then reducing the impregnated compound, e. g. by means of formaldehyde or hydrogen gas, to metallic palladium. The combination of palladium supported on activated alumina appears to be unique as a catalyst for the hydrogenation of alkylated anthraquinones and particularly 2-tertiary-butylanthraquinone, since catalysts prepared by supporting palladium on many common support materials have been found to be relatively inactive or completely inactive for this purpose. Thus, palladium supported upon silica gel, corundum, or various activated carbons such as those derived from wood, coconut shell or coal, are relatively or completely inactive for the present purpose although they may be highly active for other hydrogenation reactions. Accordingly, I prefer that the hydrogenation stage of the present process be carried out employing palladium supported on activated alumina as the hydrogenation catalyst.

The outstanding and surprisingly high solubility and stability of 2-tertiary-butylanthraquinone and its corresponding anthrahydroquinone are demonstrated in the following examples.

EXAMPLE 1

The solubilities of 2-ethylanthraquinone and 2-tertiary-butylanthraquinone in a solvent mixture consisting of 60% diisobutylcarbinol and 40% benzene by volume was determined by dissolving a known weight of the anthraquinone in the smallest amount of the solvent required to completely dissolve the material at 30° C. The densities of the resulting solutions were determined and from the proportions of solute to solvent therein the solubilities of 2-ethylanthraquinone and 2-tertiary-butylanthraquinone in terms of grams per liter of solution were calculated to be 130 and 265 g., respectively.

EXAMPLE 2

Using the procedure described in Example 1, the solubilities of 2-ethylanthraquinone and 2-tertiary-butylanthraquinone in a solvent mixture consisting of 60% diisobutylcarbinol and 40% by volume alpha-methylnaphthalene at 30° C. were found to be 150 and 293 g. per liter of solution, respectively.

The solubilities of various alkylated anthrahydroquinones in a solvent mixture consisting of 60% diisobutylcarbinol and 40% by volume alpha-methylnaphthalene were determined at 30° C. by dissolving an excess of the corresponding anthraquinone in the solvent and then quantitatively hydrogenating aliquots of the solution in the presence of a suitable hydrogenation catalyst to determine the maximum amount of hydrogen absorbed without precipitation of the anthrahydroquinone occurring. From the hydrogen absorption values found, the maximum solubilities of the anthrahydroquinones were calculated. The following table shows the solubilities obtained, given in terms of grams/l. of solution.

*Table*

| Example | Starting Anthraquinone | Starting Concentration of Anthraquinone, g./l. | Solubility in grams/l. of the Anthrahydroquinone |
|---|---|---|---|
| 3 | 2-Ethylanthraquinone | 100 | 52 |
| 4 | 2-Isopropyl-anthraquinone | 175 | 43 |
| 5 | 2-Secondary-butyl-anthraquinone | 175 | 80 |
| 6 | 2-Tertiary-butyl-anthraquinone | 175 | 114 |

From the above it will be seen that 2-tertiary-butylanthrahydroquinone is more than twice as soluble as 2-ethylanthrahydroquinone and that it is substantially more soluble than the other anthrahydroquinones. This high solubility of the 2-tertiary-butylanthrahydroquinone is particularly significant and advantageous since in practically all processes of this type the solubility of the organic intermediates in the system is limited by the solubility of the anthrahydroquinone. Thus, an alkylated anthraquinone may have a high solubility in a solvent whose use is contemplated but if the solubility of the corresponding anthrahydroquinone is low the total permissible concentrations of intermediates in the system will also be low. Therefore, using the low concentrations necessary in order to prevent precipitation of intermediates in the oxidation stage, will mean that only dilute aqueous hydrogen peroxide solutions may be obtained in the extraction step using any practical extraction method.

EXAMPLE 7

By hydrogenating aliquots of a solution of 100 grams of 2-ethylanthraquinone dissolved in a solvent consisting of 60% diisobutylcarbinol and 40% by volume benzene as described above the solubility of 2-ethylanthrahydroquinone in the resulting solution at 30° C. was found to be only 35 grams per liter. By hydrogenating aliquots of a solution of 175 grams of 2-tertiary-butylanthraquinone in the same solvent in the same general manner, the corresponding solubility of 2-tertiary-butylanthrahydroquinone in the resulting solution was found to be 100 grams per liter.

EXAMPLE 8

A working solution which had been used several weeks and which analyzed 8.4% 2-tertiary-butylanthraquinone, 5.0% tetrahydro-2-tertiary-butylanthraquinone, 5.8% unidentified solute, 28.5% diisobutylcarbinol and 52.0% alpha-methylnaphthalene, was found to have hydrogen peroxide distribution coefficients of about 84 and 58, respectively, with 10% and 30% aqueous hydrogen peroxide solutions. These values were determined by agitating a mixture of the working solution with an aqueous hydrogen peroxide solution of the concentration indicated until equilibrium was established, analyzing the organic and aqueous phases for $H_2O_2$ then dividing the concentration found in the aqueous phase by the concentration found in the organic phase.

The above working solution had been hydrogenated and oxidized continuously in a cyclic system and subjected to continuous countercurrent extraction in a column containing 40 sieve plates. It yielded consistently an extract containing 35 to 40% by weight $H_2O_2$ representing a recovery of at least 90% of the hydrogen peroxide contained in the oxidized working solution.

The results of the above example demonstrate that when using the present anthraquinone intermediate, hydrogen peroxide is produced in the working solution in the oxidation stage in concentrations which permit the obtainment of concentrated aqueous hydrogen peroxide directly by simple practical extraction methods. The obtainment of such concentrated solutions directly without resort to concentration or evaporation methods is distinctly advantageous.

The following example illustrates the exceptional stability of 2-tertiary-butylanthraquinone and its anthrahydroquinone when used for the present purpose.

EXAMPLE 9

About five liters of a working solution was made up to contain 175 g. of 2-tertiary-butylanthraquinone per liter in a solvent consisting of alpha-methylnaphthalene and diisobutylcarbinol in a volume ratio of 40 to 60. The solution was charged into a cyclic system in which it was circulated at approximately 20 cc. per minute, first through a hydrogenator and then to an oxygenator and finally an extractor for removing the hydrogen peroxide. An activated alumina supported palladium catalyst was used in the hydrogenator and this catalyst was separated from the solution before the latter was passed to the oxygenator. After the extraction the solution was returned to the hydrogenator and this cycle of operation was continued for 1975 hours during which time 26,000 g. of $H_2O_2$ was prepared. During this time, approximately 13% of the anthraquinone had been converted into non-usable by-products. This corresponded to an anthraquinone loss equivalent to only 0.005 g. per gram of 100% $H_2O_2$.

As is well-known, when starting with any alkylated anthraquinone in processes of this type, slow hydrogenation of one of the aromatic rings occurs as a side reaction so that tetrahydroanthraquinone builds up generally to a somewhat steady state. This is true when using the present alkylated anthraquinone, continued use of which results in the slow formation of tetrahydro-2-tertiary-butylanthraquinone. At the higher concentrations of the quinones, depending upon the temperature and total quinone concentration, the tetrahydrocompound will precipitate out and can be removed from the system. Tetrahydro-2-tertiary-butylanthraquinone also produces hydrogen peroxide in the reduction-oxidation cycle. Despite the fact that it is oxidized with greater difficulty, a substantial concentration thereof, e. g. equivalent to about 10 to 40% of the total anthraquinone values, is usually desirable since it increases the total anthrahydroquinone that can be held in solution and thus permits increasing the peroxide concentration in the aqueous extract. Because of this tendency for 2-tertiary-butylanthraquinone to ring hydrogenate, the present working solutions will always contain some of the tetrahydro compound after the solution has been in use for a time.

In processes of the present type it is desirable to employ working solutions containing as high concentrations of the anthraquinone and anthrahydroquinone intermediates as is possible without precipitation occurring at any point in the cycle. Substantially higher concentrations are possible when using 2-tertiary-butylanthraquinone than when using other anthraquinones. When using the preferred solvent mixtures, concentrations of the intermediates, calculated as 2-tertiary-butylanthraquinone, will usually be within the range 100 to 300 g. per liter of working solution. Factors which should be considered in choosing the concentration to be used include the solubility of the anthrahydroquinone intermediate, the temperatures to be used, the density of the resulting solution and the extent to which it is desired to carry out the hydrogenation. Generally, it is most practical to hydrogenate only part of the anthraquinone present in the working solution, using higher concentrations of the anthraquinone than would be possible without precipitation occurring if hydrogenation were carried to completion. Considering all of these factors and when using the preferred solvents, it is preferred that working solutions be employed containing intermediates in concentrations corresponding to 150 to 250 g. per liter of 2-tertiary-butylanthraquinone and to hydrogenate to only about 40 to 65% of the theoretical.

Temperatures and pressures previously proposed for processes of this type can be used. Hydrogenation usually will be carried out at 20 to 40° C., a temperature of 25 to 35° C. being preferred. Higher temperatures, e. g., up to about 50° C. can be used, but such higher temperatures appear to accelerate by-product formation. Temperatures during oxidation will usually be within the range 30 to 60° C., 40 to 50° C. being preferred. However, temperatures outside these ranges can be used.

I claim:

1. In a process for the production of hydrogen peroxide wherein an alkylated anthraquinone intermediate is hydrogenated in solution in the presence of a catalyst to produce the corresponding anthrahydroquinone and the latter is oxidized to produce hydrogen peroxide and to regenerate said alkylated anthraquinone which is recycled, the improvement comprising employing 2-tertiary-butylanthraquinone as said intermediate.

2. The process for the production of hydrogen peroxide comprising hydrogenating a solution of a mixture of 2-tertiary-butylanthraquinone and tetrahydro-2-tertiary-butylanthraquinone in the presence of a catalyst, oxidizing the resulting solution in the absence of said catalyst to produce a solution of hydrogen peroxide and regenerated anthraquinones, extracting hydrogen peroxide from said last-named solution and recycling the resulting solution of regenerated anthraquinones.

3. The process of claim 2 wherein the tetrahydro-2-tertiary-butylanthraquinone content of the mixture hydrogenated is 10–40% of the total anthraquinone content.

References Cited in the file of this patent

UNITED STATES PATENTS

| Number | Name | Date |
| --- | --- | --- |
| 2,158,525 | Riedl et al. | May 16, 1939 |
| 2,215,883 | Riedl et al. | Sept. 24, 1940 |

FOREIGN PATENTS

| Number | Country | Date |
| --- | --- | --- |
| 465,070 | Great Britain | Apr. 30, 1937 |